Aug. 13, 1940. J. H. VICTOR ET AL 2,211,247
METAL GASKET WITH SEALING COATING
Original Filed March 8, 1935 2 Sheets-Sheet 1
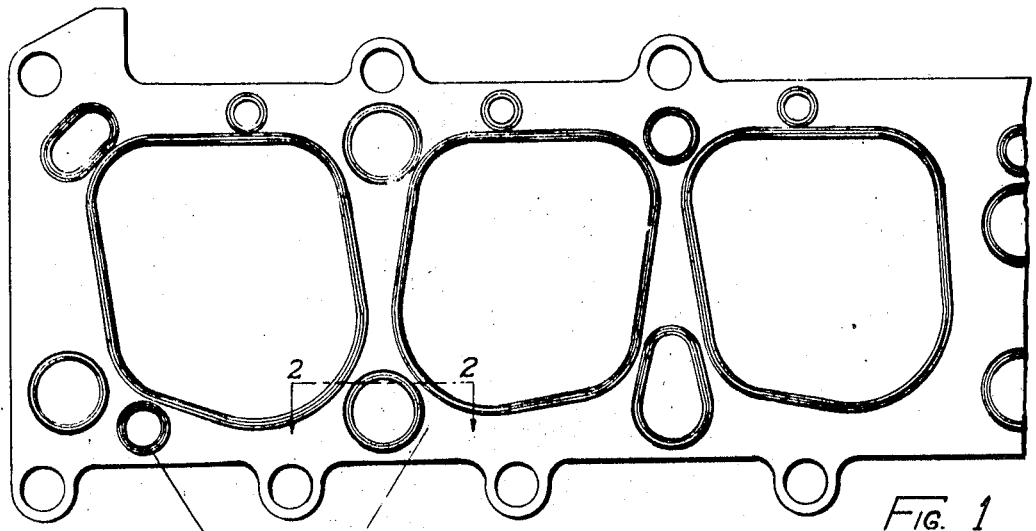
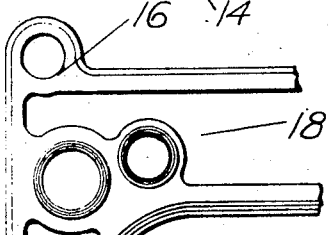
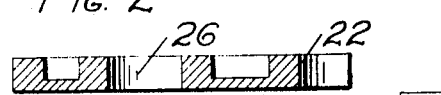
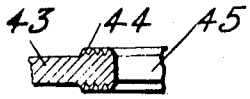
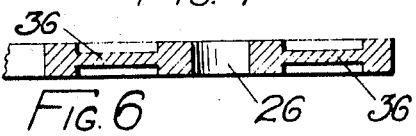
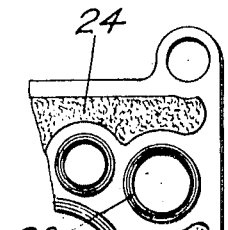
JOHN H. VICTOR
BENJAMIN J. VICTOR
INVENTORS
PER
*Albert J. Fihe*
ATTORNEY Aug. 13, 1940.    J. H. VICTOR ET AL    2,211,247
METAL GASKET WITH SEALING COATING
Original Filed March 8, 1935    2 Sheets-Sheet 2
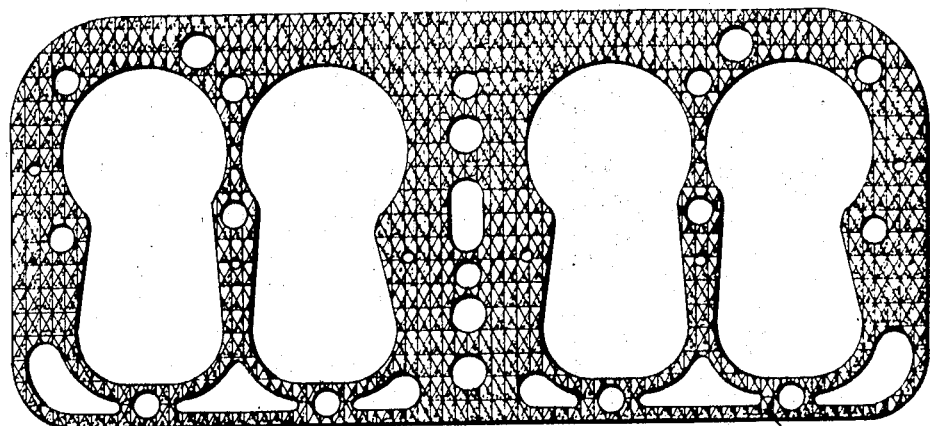
Fig. 9
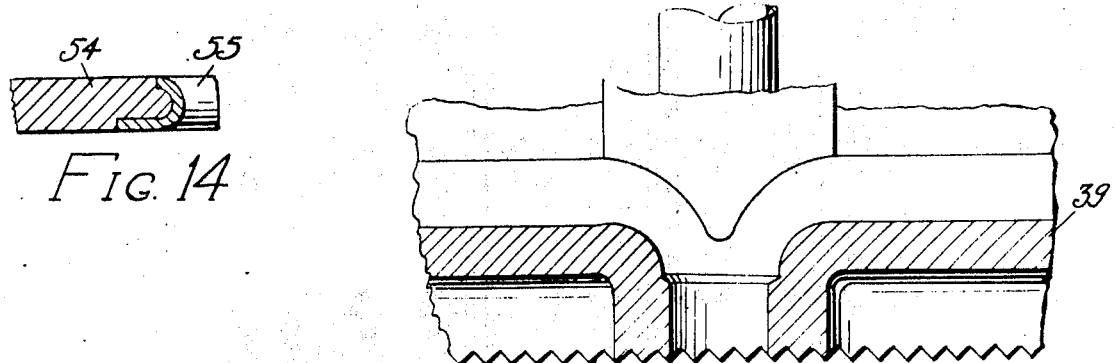
Fig. 14
Fig. 10
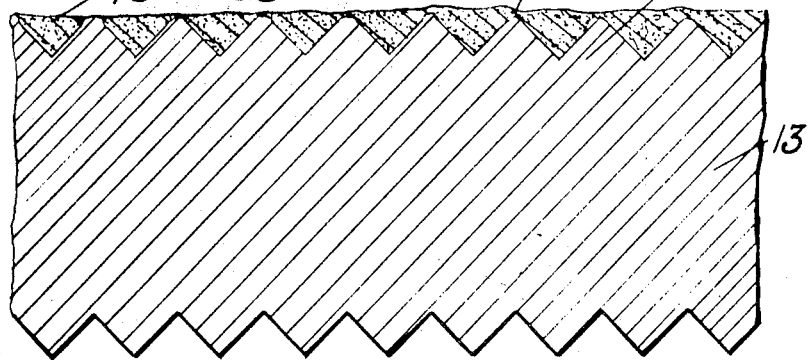
Fig. 11
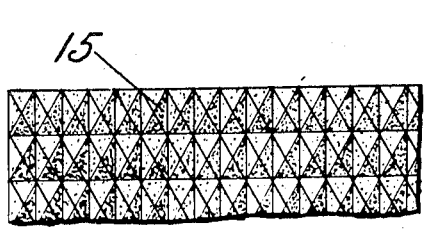
Fig. 12
JOHN H. VICTOR
BENJAMIN J. VICTOR
INVENTORS
PER *Albert J. Fihe*
ATTORNEY Patented Aug. 13, 1940

2,211,247

UNITED STATES PATENT OFFICE 2,211,247

METAL GASKET WITH SEALING COATING

John H. Victor, Wilmette, and Benjamin J. Victor, Oak Park, Ill., assignors to Victor Manufacturing & Gasket Company, Chicago, Ill., a corporation of Illinois Original application March 8, 1935, Serial No. 10,055, now Patent No. 2,127,372, dated August 16, 1938. Divided and this application July 21, 1938, Serial No. 220,478

1 Claim. (Cl. 288—23)

This invention relates to improvements in metal gasket with sealing coating, and this application constitutes a division of an application for patent on "All-metal gaskets" by these same inventors filed March 8, 1935, Serial No. 10,055 now United States Patent Number 2,127,372 dated August 16, 1938.

One of the important objects of this invention is to provide a gasket for an internal combustion engine of the high compression type which shall last as long as the motor and which can be removed and replaced from time to time whenever repairs on the motor become necessary and without affecting the properties of the gasket in any way.

Another important object of the invention is to provide a gasket which shall be completely proof against burning or blowing out even at the most vulnerable points such as the openings between the combustion chambers and which further can be used on either aluminum or cast iron heads or on any other combustion head with complete safety and entire reliability.

A still further important object of the invention is the provision in an all-metal gasket of means for efficiently cooling those portions of the gasket which are most subject to heat or burning whereby the life of the same will be indefinitely prolonged. Another object is to provide a metal which, while being relatively soft and having a relatively low melting point, has a high heat conductivity which will render it eminently suitable for work of this type.

Another and further important object of the invention is the provision of an all-metal gasket which can be die-cast or otherwise produced from a suitable metal or alloy which, on account of its nature, should be somewhat soft or resilient, while, at the same time, sufficiently resistant to heat. In order to protect those portions of the gasket more exposed to high temperatures, a reinforcement of some harder or better heat-resistant material may be incorporated, during the die-casting or other forming operation, into the material of the gasket itself.

A still further important object of the invention is to provide, in an all-metal gasket of the class described, means for insuring a positive and accurate contact of the gasket between the motor block and the cylinder head, especially at those points where a gas and liquid tight contact is especially necessary and desirable, by coating both surfaces with a pliable, heat-resisting non-sticking material.

Another object is the protection of water holes whereby adequate cooling and proper contacts at these important points is insured.

The gasket of this invention constitutes an improvement over prior Patent No. 1,932,539 granted to one of the joint inventors herein, namely Benjamin J. Victor, on October 31, 1933.

Other and further important objects of the invention will be apparent from the disclosures in the accompanying drawings and following specification.

The invention, in a preferred form, is illustrated in the drawings and hereinafter more fully described.

In the drawings:

Figure 1 is a plan view of the improved all-metal gasket of this invention showing a preferred type.

Figure 2 is a sectional view on line 2—2 of Figure 1, illustrating particularly the knurling or corrugations which make for better contact.

Figure 3 is a plan view of a portion of a similar gasket, showing a modification of the invention.

Figure 4 is a sectional view showing an adaptation of the invention.

Figure 5 is a plan view showing another modified form.

Figure 6 is a sectional view illustrating an adaptation similar to that of Figure 4.

Figure 7 illustrates a gasket similar to that shown in Figure 1 with further improvements incorporated therein.

Figure 8 is an enlarged sectional view taken on the line 8—8 of Figure 7.

Figure 9 is a plan view similar to Figure 1, showing a further modification.

Figure 10 illustrates a still further modification.

Figure 11 is a greatly enlarged sectional view.

Figure 12 is an enlarged partial plan view.

Figure 13 shows a modification, Figure 14 another.

As shown in the drawings:

The reference numeral 13 indicates generally a gasket for the cylinder head of an internal combustion engine, and in this particular embodiment of the invention, the gasket is composed entirely of metal, preferably some metal having a high heat conductivity and possibly, although not necessarily, a low melting point with, however, a certain resiliency and desired softness and toughness, and it has been discovered that these qualities and their combinations are best found in a gasket composed of an aluminum alloy.

As best shown at 14 in Figure 2, the surface of the metal adjacent the cylinder openings and adjacent the water holes, and also at any other desired places is knurled, corrugated or scored to form a means of better contact between these parts and the corresponding surfaces of the cylinder block and head. This eliminates any tendency to leakage, blow-outs, or the like. These corrugations can be incorporated into the gasket when it is made or afterwards. For example, if the gasket is die-cast, the configurations may be in the mold, while if the gasket is made of a sheet of metal stamped or cut, the corrugations can be impressed at that time, or in the sheet itself before stamping out the gasket.

In die-casting, the edges of the cylinder openings and also other openings may be reinforced with steel flanges or with flanges of some other metal as nichrome. As best shown in Figure 14, the gasket may be of die-cast material as at 54 and have reinforced combustion and other edges 55 which are made of a tougher metal. Also, the gasket itself can be made of alloys other than aluminum as, for example, copper or a copper alloy, a soft steel plate or alloys of iron and the like which can be later carbonized and hardened to a desired degree. The ideal gasket would be one composed of metal having the same coefficient of expansion as the material of the cylinder head and block, so that changes in working temperatures would not affect the relationship between the gasket and the adjacent parts.

The gasket need not necessarily be shaped along its outer edges to conform to the exterior dimensions of the head and block as it may be made over-size, if desired, as the extending portions would then act as a fin for cooling or for carrying off of heat. Further, the gasket need not be made solid, but could have portions cut away or openings left therein at various points as shown at 18 in Figure 3 so as to produce a lighter construction, if desired or necessary.

Additionally, the surface of the gasket 13 on one or both faces can be completely covered with indentations, knurling or corrugations as shown at 15 in Figures 9 and 12, which, in addition to forming a better contact with adjacent parts of the motor, could also be filled with some sort of a coating or filler as shown at 46 in Figure 11 so as to make a better seal for water and compression. Such indentations and corresponding high points will tend more readily to adjust themselves to minute irregularities in the motor head and block and form a better seal. This filler may be a resin or a digested hydrocarbon, such as elaterite.

Further, the gasket can be made of variable thickness, those portions of the gasket around the combustion chambers and water openings can preferably be made heavier or thicker than the remaining portions as at 20 in Figure 3 or these portions may be made with integral or added built-up flanges so as to produce a better seal and more intimate contact over these areas.

Another embodiment of the invention may include openings such as above-described and as shown at 18 in Figure 3, and these openings may be filled with a filler of some sort, as, for example, a plastic molded material, resin saturated asbestos or some other resilient cushioning material. Steel wool as shown at 24 in Figure 5 may also be used as a filler or as an inner reinforcing layer for outer layers of asbestos.

The heavier sheet metal or die-cast gasket 13 can be cut away at desired portions as best shown at 28 in Figure 4 so as to allow of a free circulation of water between the water holes 30 and around the bolt and like openings 26 and along areas subjected to greatest heat such as, for example, the edges of the combustion openings. A modified form of such channeling is shown in Figures 7 and 8 wherein alternate channels 32 are formed in opposite faces of the gasket, the same being connected by drilled openings or the like 34. This provides somewhat greater strength.

In Figure 6 is shown a slightly modified form of the channeling illustrated in Figure 4 wherein a channel 36 is formed on each surface of the gasket with simply a thin web therebetween to join adjacent portions of the gasket and provide somewhat of a reinforcement.

As best shown in Figure 13, a gasket 43 having knurlings or other surface markings 44 may have the combustion edges thereof further protected by means of a ring or other element 45 of a higher heat-resisting metal which can be incorporated into the gasket during the process of die-casting or otherwise.

Such a gasket may also be employed on the motor with provisions made in the motor head and block such as grooves or channels which would conform to corresponding grooves in the gasket. The head 39 itself could also be knurled as shown at 38 in Figure 10, leaving the material of the head to conform by such knurlings or corrugations to the opposed surface of the block.

In all-metal gaskets of this type, the surfaces must be corrugated or indented in some way, as shown at 14 in Figure 1 or at 15 in Figures 9, 11 and 12, and these corrugations or indentations must have some coating thereon in order to provide a perfect seal.

As best shown at 46 in Figure 11, this coating, which may be of digested elaterite or some other resilient organic material, works its way into the depressions between the ridges 15, and upon application of the gasket between the cylinder head and block, or between any other adjacent parts of a mechanism, the resilient coating is squeezed down into the depressions, allowing the high or sharp points of the protuberances 15 to contact the metal of the adjacent elements. These points are then either pressed down or distorted slightly as shown at 17 in Figure 11, whereupon the desired intimate contact between the parts results, and a non-leaking seal is provided.

The temperature of cylinder head gaskets seldom exceeds 200° F., at least over the major portion of the area. Organic materials such as herein described have shown themselves useful for coating all-metal gaskets of this type and also for filling the crevices in the indentations 38 such as may be formed in a cylinder head or the like 39 as shown in Figure 10, but it has been found that, at the usual operating temperatures in internal combustion engines, materials having a desirable plastic nature will become somewhat sticky or tacky, and it is proposed to remedy this situation by dusting the finished surface with ground vermiculite, powdered metal or the like.

As best shown in Figure 11, the filling 16 is to be flush with the upper ends 17 of the metal projections 15 so that, as the gasket wears down or is compressed, there will always be, in addition to the metal to metal contact, a cushion of the remaining material which also contacts with the metal of the cylinder head block or adjacent element.

Another advantage of this surface treatment of an all-metal gasket is that the surface will show little, if any, metal, but becomes more of a metal surface as the packing shows signs of wearing due to compression or vibrations of the motor or from rubbing due to unequal expansion of the various metals composing the gasket, cylinder head block, or the like.

We are aware that many changes may be made and numerous details of construction varied throughout a wide range without departing from the principles of this invention, and we, therefore, do not purpose limiting the patent granted hereon otherwise than as necessitated by the prior art.

We claim as our invention:

A gasket for internal combustion engines composed of a single unitary sheet of an aluminum alloy of high heat conductivity and relatively low melting point having desired openings therein, and a thin coating of digested elaterite over the faces of the gasket, together with a further coating of vermiculite over the elaterite.

JOHN H. VICTOR.
BENJAMIN J. VICTOR.